(12) United States Patent
Vincent

(10) Patent No.: US 10,584,767 B1
(45) Date of Patent: Mar. 10, 2020

(54) ENGINE SAFETY LOCK OUT

(71) Applicant: Randy Allan Vincent, Gueydan, LA (US)

(72) Inventor: Randy Allan Vincent, Gueydan, LA (US)

(73) Assignee: KP MANUFACTURING, LLC, Gueydan, LA (US)

( * ) Notice: Subject to any disclaimer, the term of this patent is extended or adjusted under 35 U.S.C. 154(b) by 0 days.

(21) Appl. No.: 16/115,502

(22) Filed: Aug. 28, 2018

Related U.S. Application Data

(60) Provisional application No. 62/550,724, filed on Aug. 28, 2017.

(51) Int. Cl.
| | | |
|---|---|---|
| *F16F 15/30* | (2006.01) | |
| *F16F 15/121* | (2006.01) | |
| *G05G 1/02* | (2006.01) | |
| *G05G 5/06* | (2006.01) | |
| *G05G 5/24* | (2006.01) | |
| *B60R 25/00* | (2013.01) | |
| *B60R 25/04* | (2013.01) | |
| *B60R 25/06* | (2006.01) | |
| *F16D 127/04* | (2012.01) | |

(52) U.S. Cl.
CPC ............ *F16F 15/30* (2013.01); *B60R 25/007* (2013.01); *B60R 25/04* (2013.01); *B60R 25/06* (2013.01); *F16F 15/1218* (2013.01); *G05G 1/02* (2013.01); *G05G 5/065* (2013.01); *G05G 5/24* (2013.01); *B60R 2025/0405* (2013.01); *F16D 2127/04* (2013.01); *F16F 2230/0041* (2013.01)

(58) Field of Classification Search
CPC ............... F16F 15/30; F16F 15/1218; F16F 2230/0041; G05G 1/02; G05G 5/06; G05G 5/065; G05G 5/12; G05G 5/18; G05G 5/24; B60R 25/00; B60R 25/007; B60R 25/04; B60R 25/06; B60R 2025/0405; F16D 47/04; F16D 2127/04
USPC .... 74/527, 530, 572.1, 572.11, 578; 70/190, 70/226, 237, 312
See application file for complete search history.

(56) References Cited

U.S. PATENT DOCUMENTS

| | | | |
|---|---|---|---|
| 692,538 A | | 2/1902 | Niemeyer |
| 701,533 A | | 6/1902 | Bramwell |
| 1,057,537 A | | 4/1913 | Foucher |
| 1,228,264 A | * | 5/1917 | Toussaint ................ E05B 37/02 70/312 |
| 1,370,970 A | | 3/1921 | Jordan |
| 1,434,515 A | * | 11/1922 | Watson ................ B60R 25/007 70/255 |
| 1,523,086 A | * | 1/1925 | Schutza ................ B60R 25/007 70/237 |
| 1,710,425 A | | 4/1929 | Lorimer |
| 2,121,869 A | | 6/1938 | Greenawalt |
| 2,221,101 A | | 11/1940 | Lefkowitz |
| 4,930,371 A | * | 6/1990 | Schneider ............... F02B 75/06 123/198 R |
| 5,031,901 A | | 7/1991 | Saarinen |
| 5,549,183 A | | 8/1996 | Buchanan, Jr. et al. |
| 8,869,650 B1 | * | 10/2014 | Harris ..................... F16F 15/30 188/18 R |

(Continued)

*Primary Examiner* — Prasad V Gokhale
(74) *Attorney, Agent, or Firm* — Greg Mier

(57) ABSTRACT

A safety device designed to lock an engine flywheel and shaft in place during maintenance and repairs on the engine.

9 Claims, 6 Drawing Sheets

(56) References Cited

U.S. PATENT DOCUMENTS

2011/0185842 A1* 8/2011 Whitehead .............. G05G 5/06
74/527

* cited by examiner

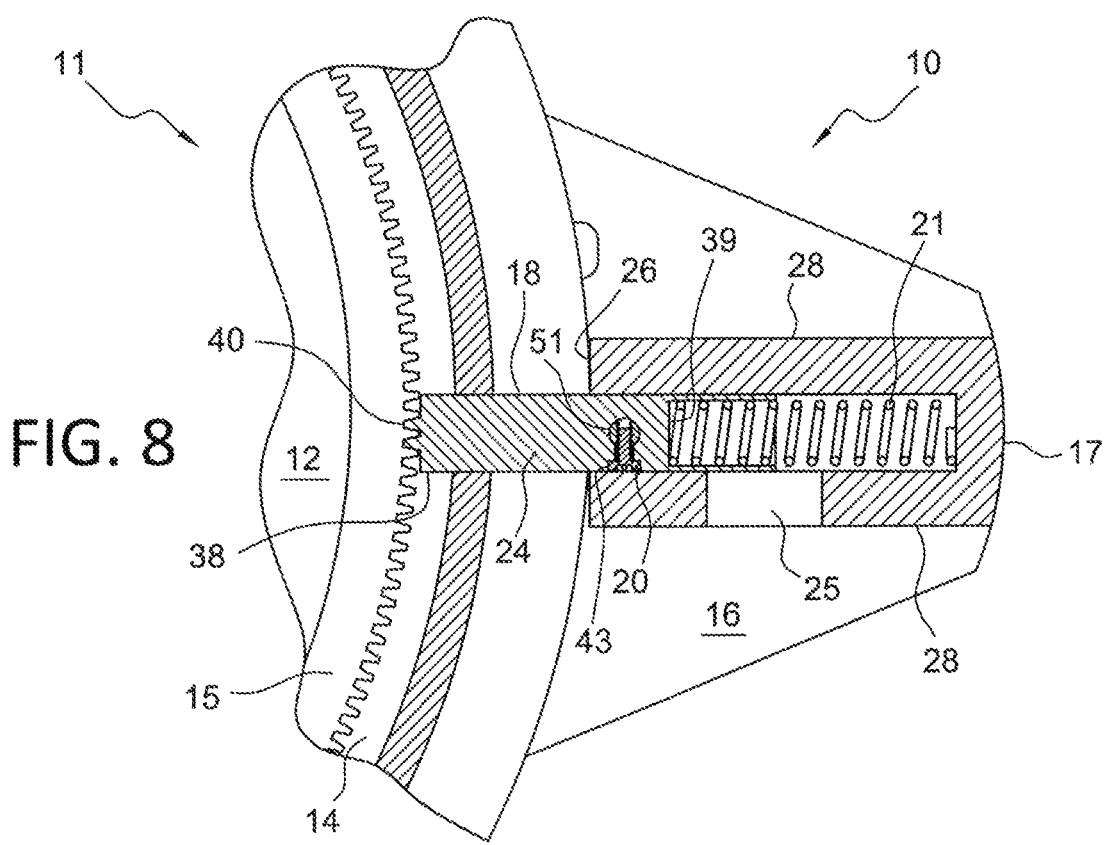
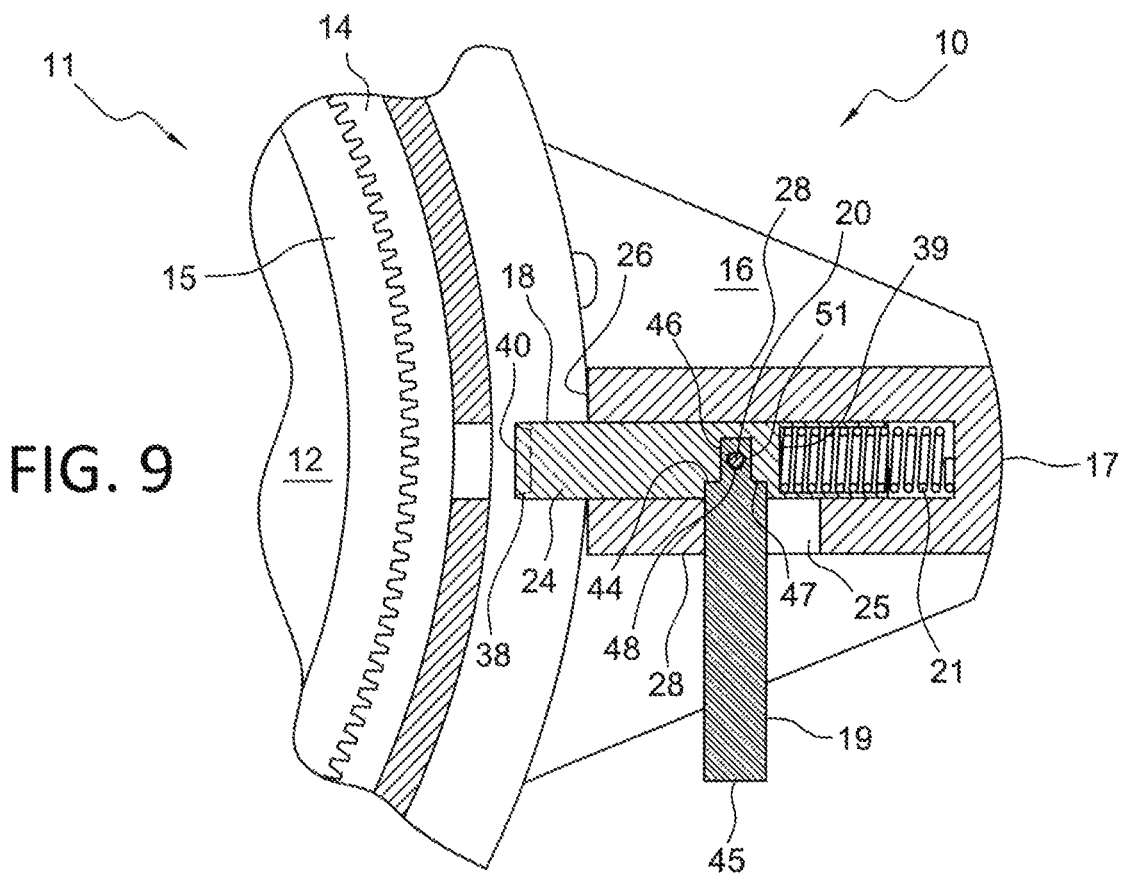

ENGINE SAFETY LOCK OUT

CROSS-REFERENCE TO RELATED APPLICATIONS

The present application claims priority from provisional patent application No. 62/550,724, filed on Aug. 28, 2017.

STATEMENT REGARDING FEDERAL SPONSORED RESEARCH OR DEVELOPMENT

Not applicable.

FIELD OF THE INVENTION

The subject invention relates generally to engines. More particularly, the subject invention relates to a safety device for preventing an engine flywheel from rotating during maintenance and repairs on the engine.

BACKGROUND OF THE INVENTION

Internal combustion engines are used in a number of industrial applications, such as integral gas compressors used to compress natural gas at gas transmission stations. The engines typically have long shafts which rotate in bearing saddles and operate in conjunction with valves and other moving components.

One end of the rotating shaft typically terminates in a flywheel to assist in rotational momentum of the shaft. The outside edge of the flywheel often contains a series of peripherally arranged teeth so that the radial edge of the flywheel is in the form of a gear.

Periodically, maintenance and repair work are necessary on an engine. During maintenance and repair work, it is critical to lock the shaft and the flywheel in place while personnel are in and around the shaft, the flywheel, and other parts of the engine. Any inadvertent movement of the shaft or the flywheel could lead to injuries or worse. These injuries (or worse) can be avoided by locking the flywheel in place, so that the shaft and other parts of the engine do not move during the maintenance and repair work.

The present invention is designed to lock an engine flywheel and shaft in place during maintenance and repairs on the engine.

BRIEF DESCRIPTION OF THE ATTACHED DRAWINGS

The accompanying drawings are provided for the purpose of illustration only and are not intended as a definition of the limits of the present invention. The drawings illustrate a preferred embodiment of the present invention.

FIG. 8 is a cross-sectional view of a preferred embodiment of the engine safety lock out invention along line 8-8 of FIG. 6.

FIG. 9 is a cross-sectional view of a preferred embodiment of the engine safety lock out invention along line 9-9 of FIG. 7.

DETAILED DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
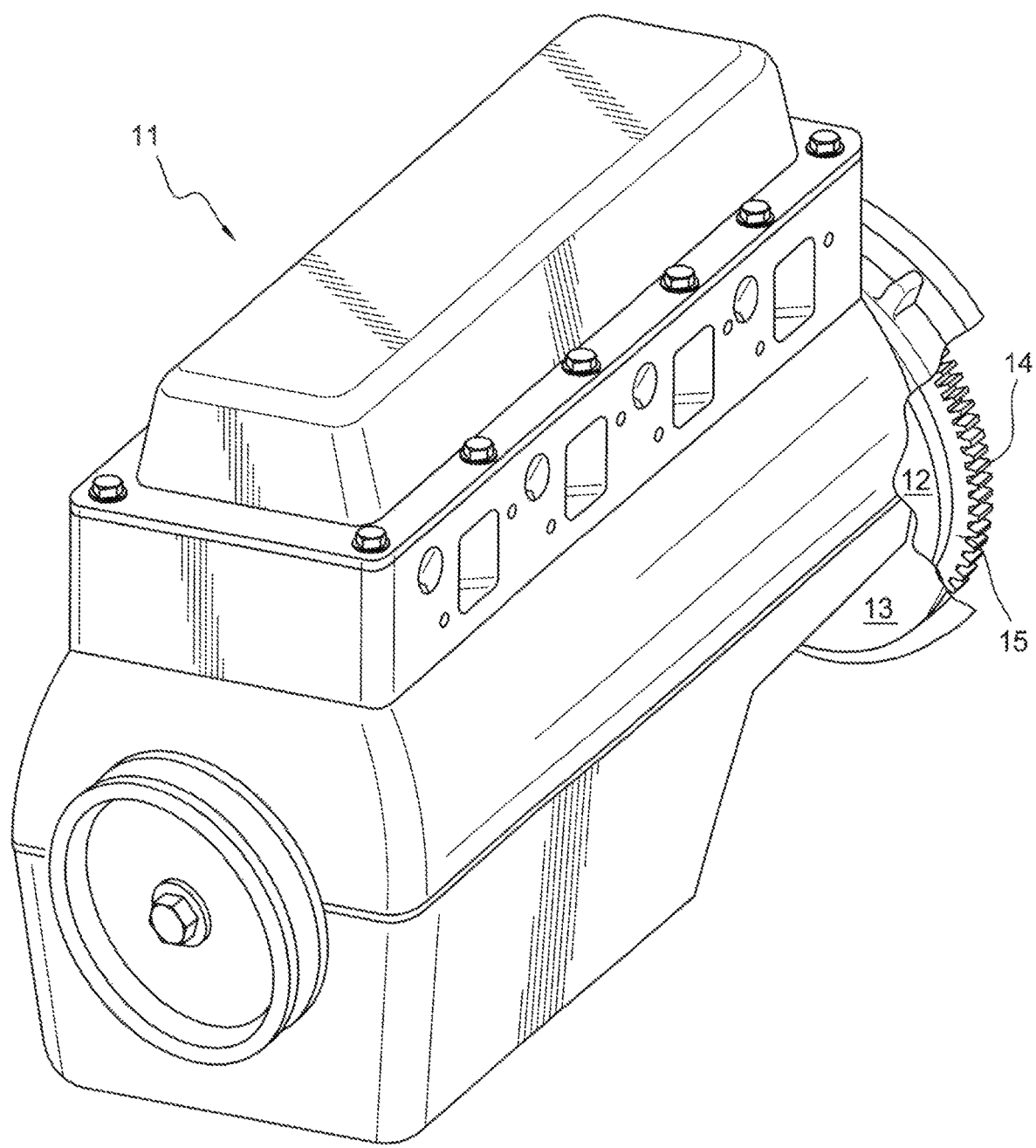
FIG. 1 is an isometric view of an engine block showing a flywheel.
Figure 2:
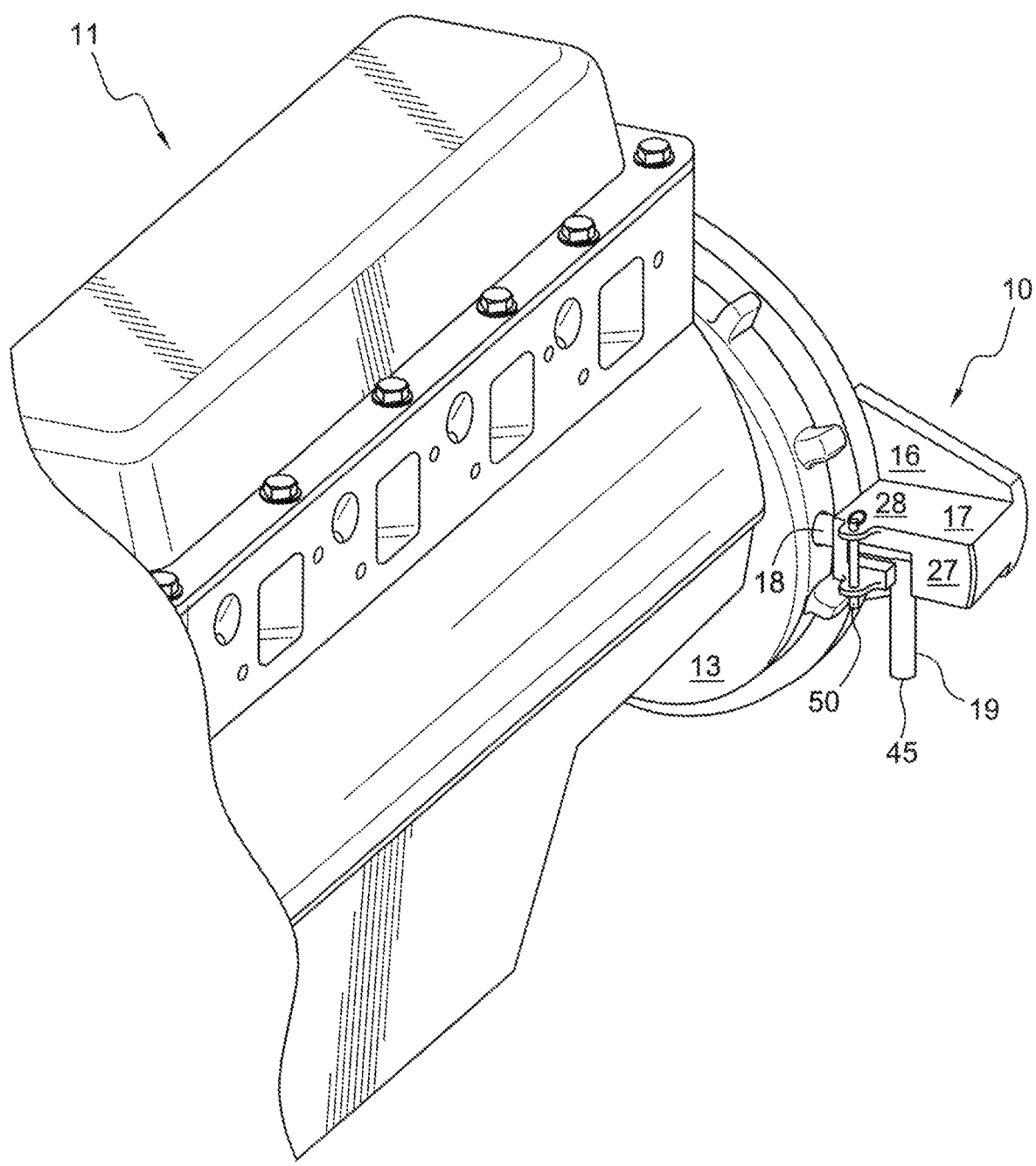
FIG. 2 is an isometric view of an engine block showing a preferred embodiment of the engine safety lock out invention attached to the flywheel housing.

The engine safety lock out device 10 of the present invention is designed to be used with an internal combustion engine 11, parts of which, by way of example, are shown in FIGS. 1 and 2. Engine safety lock out device 10 is preferably used with an engine 11 having a flywheel 12, where flywheel 12 is preferably enclosed in a flywheel housing 13, and where flywheel 12 is preferably equipped with a series of peripherally arranged teeth 14 on its radial edge 15, as shown in FIG. 1.

As shown in FIGS. 2 through 9, the primary components of engine safety lock out device 10 preferably include a base 16, a body 17, a locking shaft 18, a handle 19, a set screw 20, a spring 21, and a safety pin 50 (shown in FIGS. 3, 4, 6 and 7).

Figure 4:
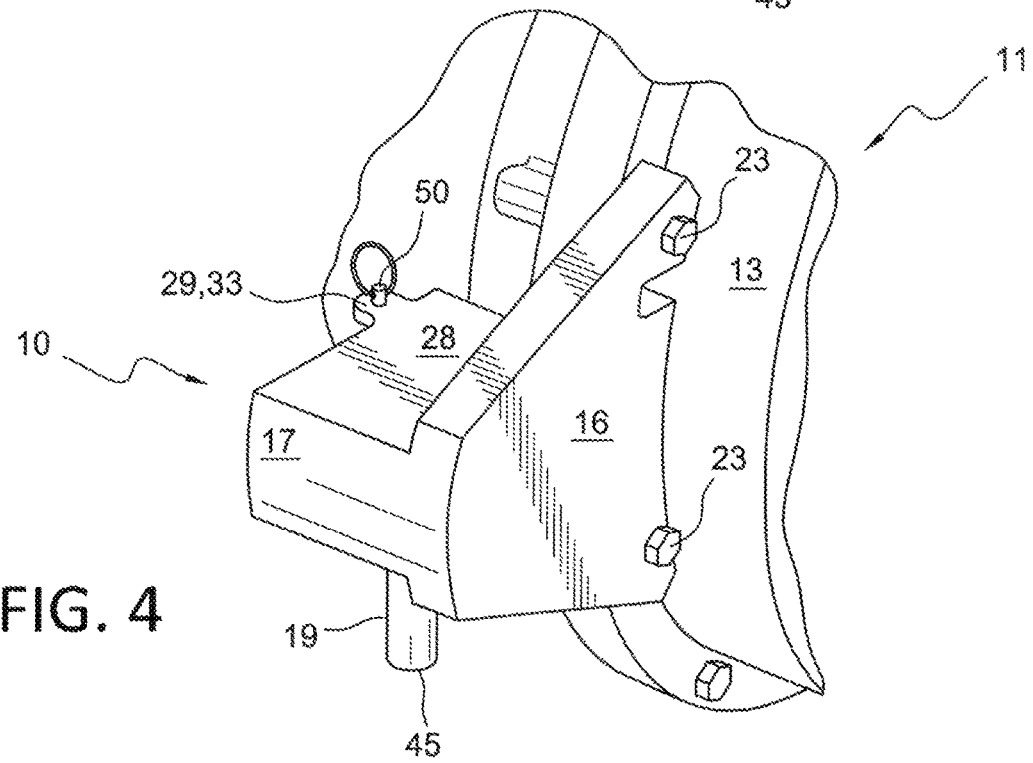
FIG. 4 is an isometric view of a preferred embodiment of the engine safety lock out invention attached to a flywheel housing.
Figure 5:
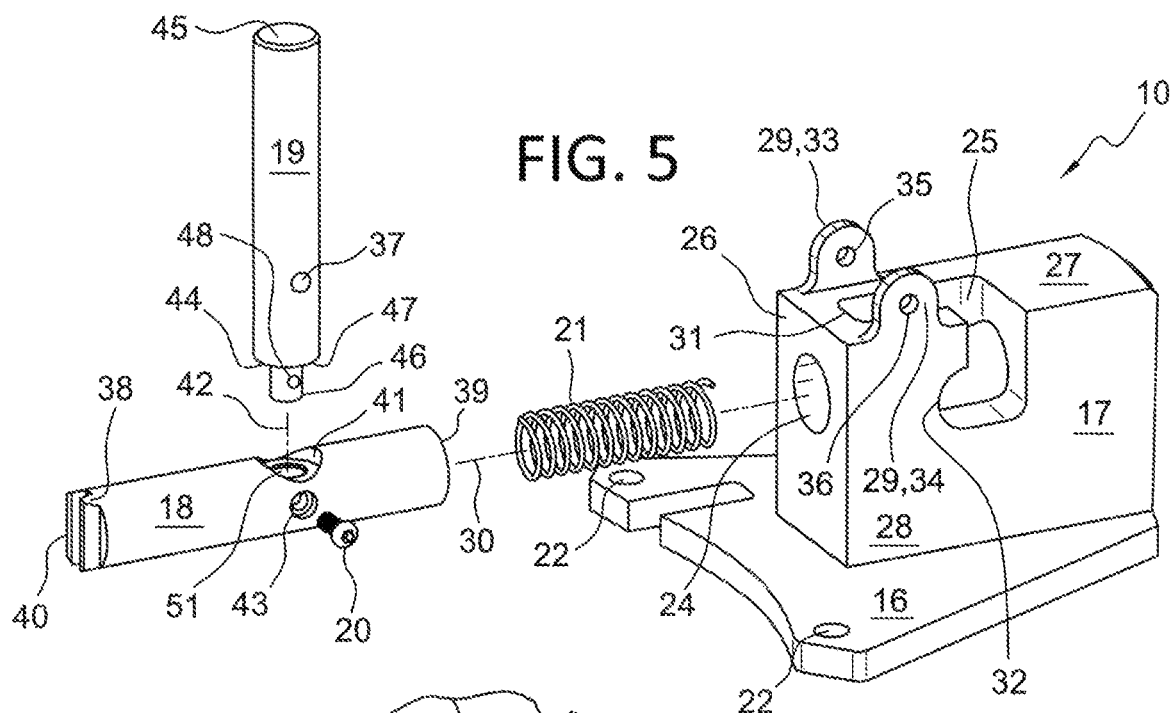
FIG. 5 is an isometric, exploded view of a preferred embodiment of the engine safety lock out invention.

Base 16 can be any shape that can be attached to a flywheel housing 13 but at least a portion of base 16 is preferably flat to facilitate attachment of base 16 to flywheel housing 13, as shown in FIGS. 2, 4, 6, and 7. Base 16 is preferably made of metal, but base 16 can be made of any durable, rigid material. Base 16 can be attached to flywheel housing 13 using various methods known in the art, such as, for example, welding, bolting, clamping, latching, and screwing. Base 16 is preferably bolted to flywheel housing 16. As shown in FIG. 5, base 16 is preferably equipped with two bolt holes 22 to coincide with the bolts 23 (shown in FIG. 4), which are used to hold flywheel housing 13 together. Regarding the preferred embodiment, before base 16 is placed into position on flywheel housing 13, bolts 23 are removed from flywheel housing 13. When base 16 is placed into position on flywheel housing 13, as shown in FIGS. 2, 4, 6, and 7, bolts 23 are inserted through holes 22 and threaded into flywheel housing 13 until base 16 is tightly secured to flywheel housing 13, as shown in FIGS. 2, 4, 6, 7, 8, and 9.

Body 17 is preferably permanently attached to base 16. Body 17 and base 16 can be machined as one piece or attached together using various methods known in the art, such as, for example, welding. Body 17 is preferably made of metal, but body 17 can be made of any durable, rigid material. As shown in FIGS. 3 through 7, body 17 extends from base 16 to form a mass having a hole 24, a multi-directional slot 25, a front wall 26, a top wall 27, two side walls 28, and a set of pad eyes 29, best seen in FIG. 5.

Figure 6:
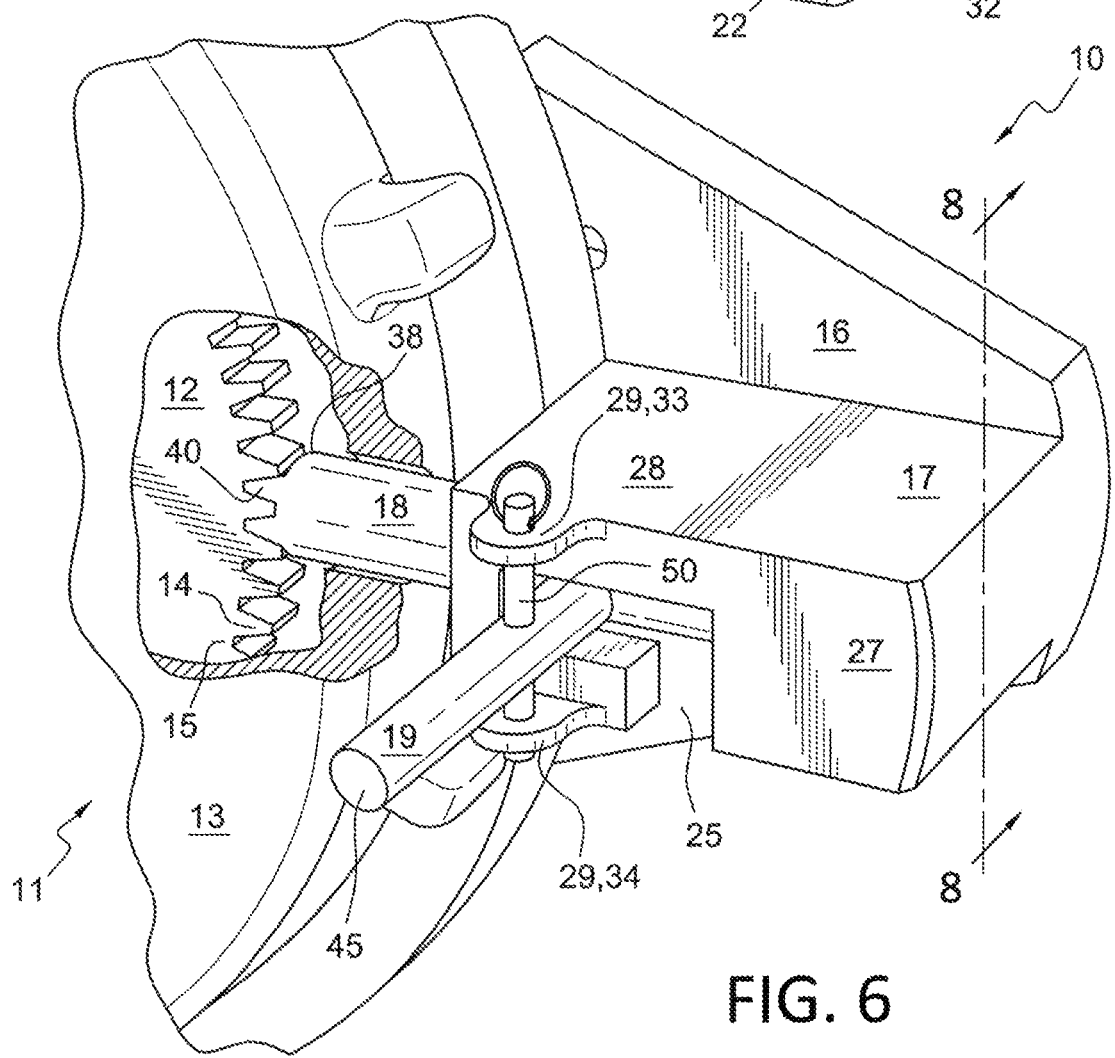
FIG. 6 is an isometric view of a preferred embodiment of the engine safety lock out invention engaged with a flywheel.
Figure 7:
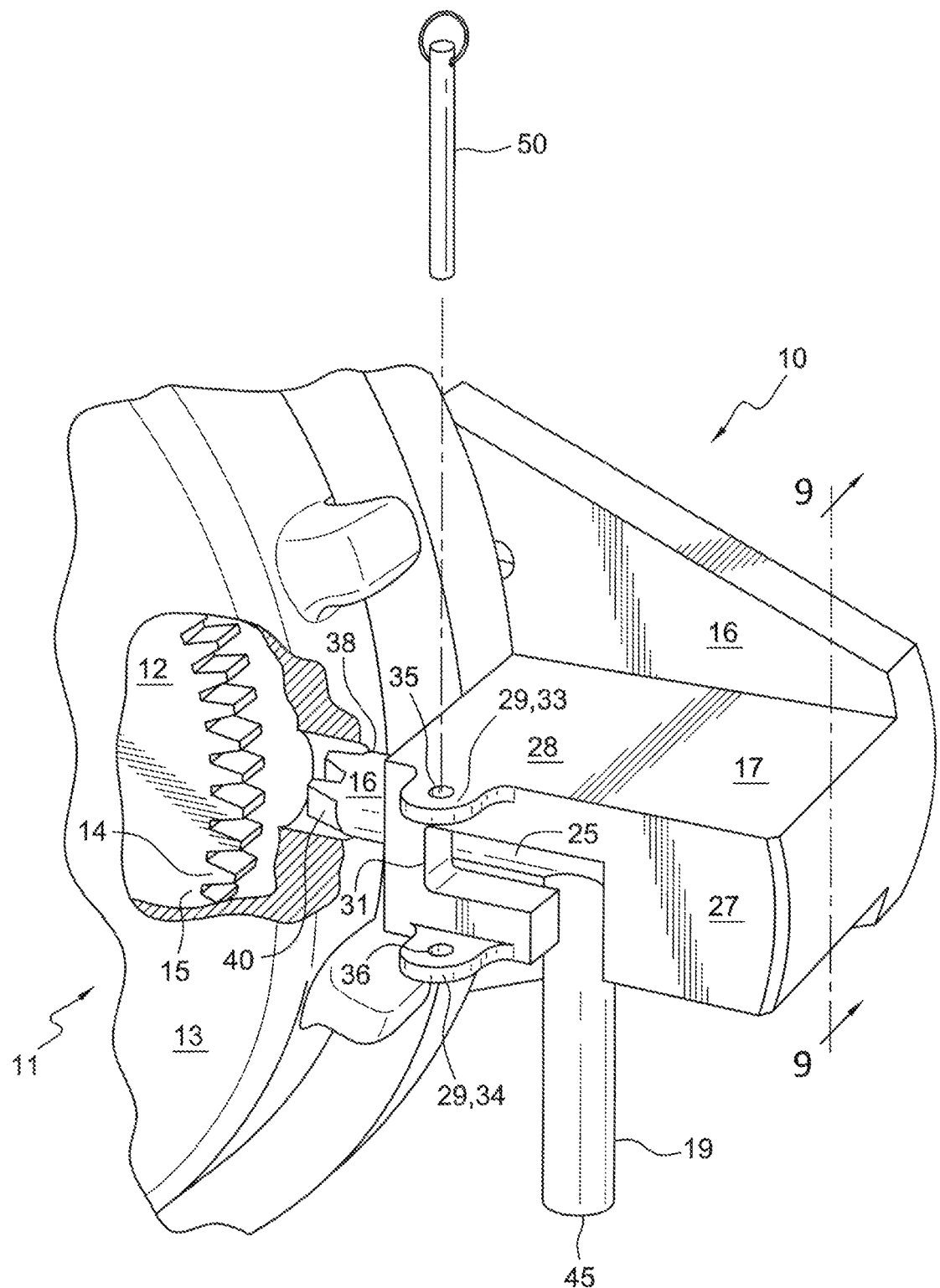
FIG. 7 is an isometric view of a preferred embodiment of the engine safety lock out invention disengaged from a flywheel.

Hole 24 is preferably bored through the front wall 26 of body 17 so that when base 16 is attached to flywheel housing 13, as shown in FIGS. 2, 4, 6, 7, 8, and 9, the longitudinal axis 30 of hole 24, shown in FIG. 5, is perpendicular to the tangent of flywheel 12 where locking shaft 18 engages the teeth 14 of flywheel 12, as shown in FIGS. 6 and 8. The length of hole 24 into body 17 should be long enough to house a compressed spring 21 and a portion of locking shaft 18 when locking shaft 18 is in its retracted position, as shown in FIGS. 7 and 9. As discussed below, the preferred length of locking shaft 18 is approximately nine inches and the preferred length of spring 21 is approximately four inches (in its non-compressed state). The diameter of hole 24 should be slightly larger than the outer diameter of locking shaft 18 and the outer diameter of spring 21. As discussed below, the preferred diameter of locking shaft 18 and spring 21 are approximately one and one-half inches. The preferred clearance between the diameter of hole 24 and the outer diameter of locking shaft 18 is 0.009 inches. The preferred clearance between the diameter of hole 24 and the outer diameter of spring 21 is 0.05 inches.

Slot 25 is preferably cut into top wall 27 of body 17 and into one of two side walls 28 of body 17, as shown in FIG. 5. The depth of slot 25 preferably extends from top wall 27 to hole 24 and from one of two side walls 28 to hole 24, as best seen in FIG. 5. The width of slot 24 should be sufficient to allow for handle 19 to maneuver through slot 25. As discussed below, the preferred diameter of handle 19 is approximately one inch. A first end 31 of slot 25 preferably begins on top wall 27 near front wall 26. From first end 31, slot 25 preferably extends along top wall 27 vertically above hole 24 and parallel to the longitudinal axis 30 of hole 24. Slot 25 then turns ninety degrees toward one of the two sides walls 28 and extends toward said side wall 28 until it reaches said side wall 28. Slot 25 then extends down said side wall 28 and then turns ninety degrees toward front wall 26 at a point where the longitudinal axis of slot 25 is horizontally parallel and in line with the longitudinal axis 30 of hole 24. Slot 25 ends at a second end 32 on said side wall 28 at a point farther from front wall 26 than first end 31.

Set of pad eyes 29 preferably extend vertically from top wall 27 of body 17, as shown in FIG. 5. One pad eye 33 of said set of pad eyes 29 is preferably located on top wall 27 near first end 31 on one side of slot 25. Another pad eye 34 of said set of pad eyes 29 is preferably located on top wall 27 near first end 31 on the opposite side of slot 25, as shown in FIG. 5. Pad eyes 33 and 34 are preferably made of metal, but pad eyes 33 and 34 can be made of any durable, rigid material. Pad eyes 33 and 34 can be machined onto body 17 or attached to body 17 using various methods known in the art, such as, for example, welding. Each pad eye 33 and 34 are preferably equipped with a pin hole 35 and 36, respectively, as shown in FIG. 5. The ideal locations of pad eyes 33 and 34 are where pin holes 35 and 36 line up with pin hole 37 of handle 19 when handle 19 is connected to locking shaft 18 and locking shaft 18 is engaged with teeth 14 of flywheel 12, as best shown in FIG. 6.

As shown in FIG. 5, locking shaft 18 is preferably cylindrical in shape with a first end 38 and a second end 39. Locking shaft 18 is preferably made of metal, but locking shaft 18 can be made of any durable, rigid material. The preferred dimensions of locking shaft 18 are approximately nine inches in length and one and one-half inches in diameter. These dimensions can be adjusted depending on the size of engine 11 and flywheel 12.

The first end 38 of locking shaft 18 is preferably equipped with a set of teeth 40 that are designed to engage the peripherally arranged teeth 14 on the radial edge 15 of a flywheel 12, as shown in FIG. 6. The second end 39 of locking shaft 18 is preferably flat to butt up against spring 21 when locking shaft 18 and spring 21 are inserted into hole 24 in body 17, as shown in FIGS. 8 and 9.

Locking shaft 18 is also equipped with a circular recess 41 and a hole 51, as shown in FIG. 5, for receiving handle 19. Circular recess 41 and hole 51 are preferably positioned along the length of locking shaft 18. The precise location of circular recess 41 and hole 51 will depend on the size of engine 11 and the distance between front wall 26 of body 17 and peripherally arranged teeth 14 on radial edge 15 of flywheel 12. Circular recess 41 and hole 42 are preferably positioned on the circumference of locking shaft 18 so that when handle 19 is attached to locking shaft 18, the longitudinal axis 42 of handle 19 is parallel with the set of teeth 40 on the first end 38 of locking shaft 18, as shown in FIG. 5.

Locking shaft 18 is also equipped with a set screw hole 43 for receiving set screw 20. Set screw hole 43 is preferably positioned at substantially the same longitudinal position along the length of locking shaft 18 as circular recess 41 and a hole 51. Set screw hole 43 is preferably positioned on the circumference of locking shaft 18 ninety degrees from circular recess 41 and hole 51, as shown in FIG. 5. Set screw hole 43 preferably extends through locking shaft 18 until it reaches hole 51, as shown in FIG. 8.

As shown in FIG. 5, handle 19 is preferably cylindrical in shape with a first end 44 and a second end 45. However, handle 19 can have other geometric cross-sectional shapes as well. The preferred dimensions of handle 19 are approximately six inches in length and one inch in diameter. Handle 19 is preferably made of metal, but handle 19 can be made of any durable, rigid material.

First end 44 of handle 19 preferably has a projection 46 that has the same longitudinal axis 42 as handle 19. Projection 46 is preferably cylindrical. Projection 46 has a threaded set screw hole 48, as shown in FIG. 5. Threaded set screw hole 48 is located on cylindrical projection 46 so that when cylindrical projection 46 is inserted into hole 51 of locking shaft 18, threaded set screw hole 48 lines up with set screw hole 43 on locking shaft 18. In this configuration, set screw 20 can be inserted through set screw hole 43 on locking shaft 18 and threaded into threaded set screw hole 48 of cylindrical projection 46 to securely connect handle 19 to locking shaft 18.

The diameter of handle 19, which is approximately one inch, is shorter than the diameter of circular recess 41 of locking shaft 18 so that the wall-to-wall clearance between handle 19 and circular recess 41 is in the range of 0.009 and 0.05 inches. The diameter of cylindrical projection 46 is shorter than the diameter of handle 19, which creates a shoulder 47 at first end 44 of handle 19. The diameter of cylindrical projection 46 is shorter than the diameter of hole 51 of locking shaft 18 so that the wall-to-wall clearance between cylindrical projection 46 and hole 51 is in the range of 0.009 and 0.05 inches.

Figure 3:
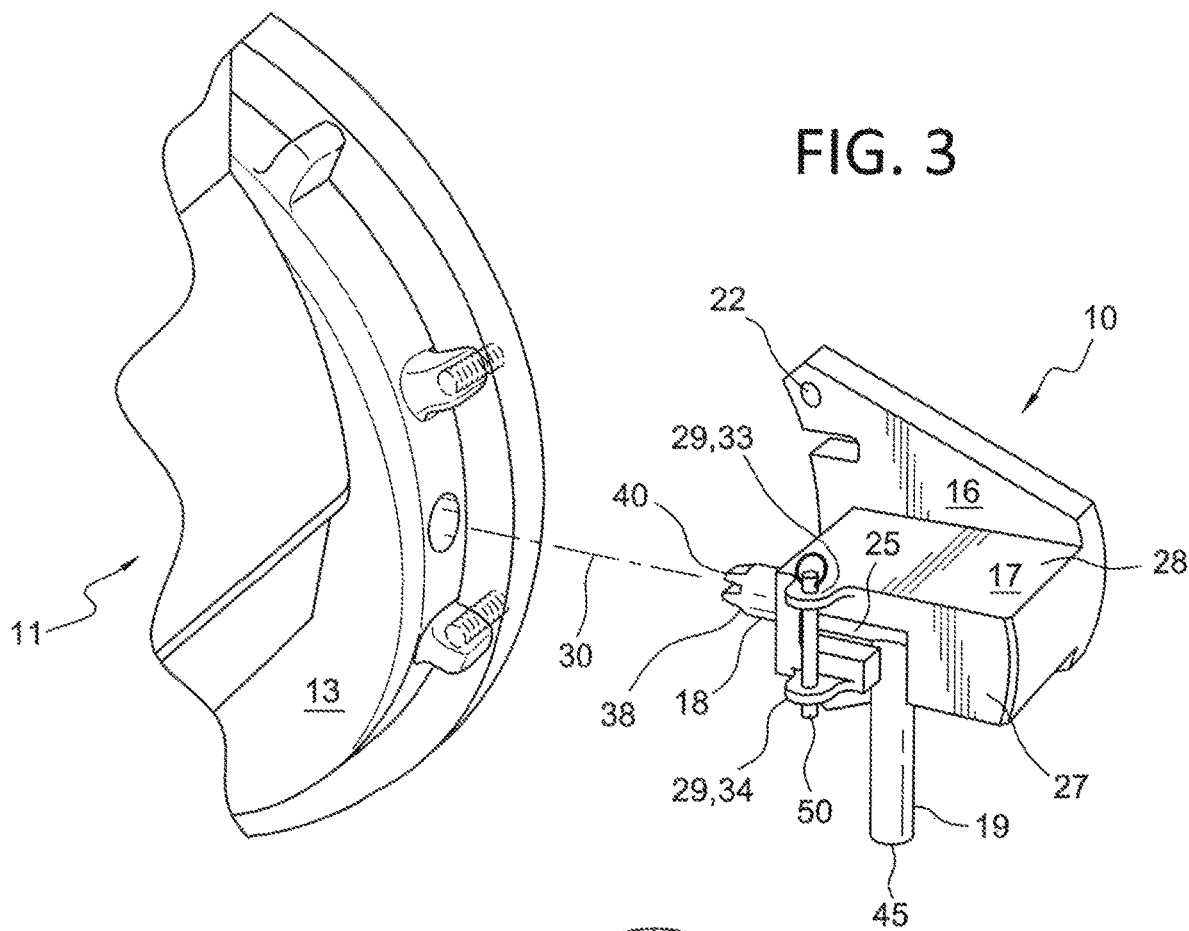
FIG. 3 is an isometric view of a flywheel housing in spaced relationship with a preferred embodiment of the engine safety lock out invention.

Handle 19 has a pin hole 37, as shown in FIG. 5, that extends through handle 19. Pin hole 37 is located on handle 19 so that when handle 19 is connected to locking shaft 18 and set of teeth 40 of locking shaft 18 are engaged with peripherally arranged teeth 14 on radial edge 15 of flywheel 12, as shown in FIG. 6, pin hole 37 is lined up with pin hole 35 in pad eye 33 and pin hole 36 in pad eye 34, as shown in FIGS. 2, 3, and 6.

Spring 21 is preferably designed to fit inside hole 24 in body 17. The preferred dimensions of spring 21 are approximately four inches in length (in non-compressed state) and one and one-half inches in diameter. Spring 21 is preferably designed to remain under tension when locking shaft 18 is retracted into hole 24 in body 17 and when set of teeth 40 of locking shaft 18 are engaged with teeth 14 of flywheel 12. In effect, spring 21 facilitates the movement of locking shaft 18 from its retracted position inside hole 24 to its extended position when set of teeth 40 of locking shaft 18 are engaged with peripherally arranged teeth 14 on radial edge 15 of flywheel 12.

Safety pin 50 is preferably cylindrical in shape, as shown in FIG. 7. Safety pin 50 is preferably made of metal, but safety pin 50 can be made of any durable, rigid material. The diameter of safety pin 50 should be shorter than the diameters of pin hole 35 in pad eye 33, pin hole 36 in pad eye 34, and pin hole 37 in handle 19 to allow safety pin 50 to slide in and out of pin hole 35 in pad eye 33, pin hole 36 in pad eye 34, and pin hole 37 in handle 19. The primary purpose of safety pin 50 is to lock handle 19 and locking shaft 18 in place when set of teeth 40 of locking shaft 18 are engaged with peripherally arranged teeth 14 on radial edge 15 of flywheel 12, as shown in FIG. 6.

During assembly of engine safety lock out device 10, spring 21 is inserted into hole 24 in body 17, which is attached to base 16. Next, locking shaft 18 is inserted into hole 24 in body 17 until circular recess 41 and a hole 51 of locking shaft 18 are exposed through slot 25 in body 17. Next, cylindrical projection 46 on first end 44 of handle 19 is inserted into hole 51 of locking shaft 18 until shoulder 47 at first end of handle 19 meets circular recess 41 of locking shaft 18 and threaded set screw hole 48 on cylindrical projection 46 on first end 44 of handle 19 is lined up with set screw hole 43 on locking shaft 18. Next, set screw 20 is inserted through set screw hole 43 on locking shaft 18 and threaded into threaded set screw hole 48 of cylindrical projection 46 on first end 44 of handle 19 to securely connect handle 19 to locking shaft 18.

To attach engine safety lock out device 10 to an engine 11, various methods known in the art can be used, such as, for example, welding, bolting, clamping, latching, and screwing. The preferred method of attaching engine safety lock out device 10 to an engine 11 is through the use of bolts. Before base 16 of engine safety lock out device 10 can be placed into position on flywheel housing 13 of engine 11, bolts 23, shown in FIGS. 3 and 4, are removed from flywheel housing 13. Next, holes 22 of base 16 are lined up with the holes on flywheel housing 13 where bolts 23 were removed. If necessary, slot 52 on base 16, shown in FIGS. 3 through 9, is positioned over any obstruction on flywheel housing 13 so that base 16 is flush against flywheel housing 13. When base 16 is position on flywheel housing 13, as shown in FIGS. 2, 4, 6, and 7, bolts 23 are inserted through holes 22 and tightened so that base 16 is tightly secured to flywheel housing 13.

In use, engine safety lock out device 10 prevents flywheel 12 from turning by maneuvering handle 19 through slot 25 in body 17 to extend locking shaft 18 from hole 24 of body 17 until set of teeth 40 on first end 38 of locking shaft 18 engage flywheel teeth 14 on radial edge 15 of flywheel 12 of engine 11, as shown in FIGS. 6 and 8. Spring 21 in hole 24 in body 17 applies force against locking shaft 18 to keep set of teeth 40 on first end 38 of locking shaft 18 engaged with flywheel teeth 14 on radial edge 15 of flywheel 12 of engine 11. In this position, safety pin 50 is inserted into pin hole 35 in pad eye 33, pin hole 36 in pad eye 34, and pin hole 37 in handle 19 to prevent handle 19 from moving and to prevent set of teeth 40 on first end 38 of locking shaft 18 from disengaging flywheel teeth 14 on radial edge 15 of flywheel 12 of engine 11.

When the engine safety lock out device is no longer needed to prevent flywheel 12 from turning, safety pin 50 is removed from pin hole 35 in pad eye 33, pin hole 36 in pad eye 34, and pin hole 37 in handle 19. Handle 19 is then maneuvered through slot 25 of body 17 to slide locking shaft 18 further into hole 24 of body 17 until set of teeth 40 on first end 38 of locking shaft 18 disengage from flywheel teeth 14 on radial edge 15 of flywheel 12 of engine 11. Handle 19 is further maneuvered through slot 25 of body 17 until handle 19 reaches the second end 32 of slot 25 near front wall 26 of body 17. In this position, spring 21 in hole 24 in body 17 applies force against locking shaft 18 to keep handle 19 second end 32 of slot 25 near front wall 26 of body 17.

It is understood that one embodiment of the present invention has been disclosed by way of example and that other modifications and alterations may occur to those skilled in the art without departing from the scope and spirit of the present invention.

What is claimed is:

1. A lock out device for engaging peripherally arranged teeth on a radial edge of a circular flywheel in a flywheel housing of an engine, said lock out device comprising:

(a) a base for attaching said lock out device to said flywheel housing of said engine;

(b) a body attached to said base, said body having a front wall, a top wall, and two side walls, said body having a hole bored into said body through said front wall of said body, said hole having a longitudinal axis perpendicular to a tangent of said circular flywheel;

(c) a multi-directional slot cut into said top wall of said body and into one of said two side walls of said body, where a first portion of said slot has a depth that extends from said top wall of said body to said hole bored into said body, and where a second portion of said slot has a depth that extends from said one of said two side walls of said body to said hole bored into said body, where a first end of said slot begins on said top wall of said body near said front wall of said body, where said slot extends from said first end of said slot along said top wall of said body parallel to said longitudinal axis of said hole bored into said body, at which point said slot turns ninety degrees toward said one of said two sides walls of said body and extends toward said side wall until said slot reaches said side wall, at which point said slot extends down said side wall and then turns ninety degrees toward said front wall of said body and extends toward said front wall of said body parallel to said longitudinal axis of said hole bored into said body, where said slot ends at a second end of said slot on said side wall of said body at a point farther from said front wall of said body than said first end of said slot;

(d) a set of pad eyes extending from said top wall of said body perpendicular to said top wall, where one pad eye of said set of pad eyes is located near said first end of said slot on one side of said slot, where another pad eye of said set of pad eyes is located near said first end of said slot on the opposite of said slot, where each pad eye is equipped with a pin hole;

(e) a spring inserted into said hole of said body;

(f) a locking shaft inserted into said hole of said body after said spring is inserted into said hole of said body, said locking shaft having a first end and a second end, said first end of said locking shaft equipped with a set of teeth for engaging said peripherally arranged teeth on said radial edge of said circular flywheel in said flywheel housing of said engine; said second end of said locking shaft equipped to butt up against said spring when said locking shaft and said spring are inserted into said hole in said body, said locking shaft equipped with a circular recess and a hole within said circular recess between said first end and said second end of said locking shaft, said locking shaft equipped with a set screw hole adjacent to said circular recess and said hole within said circular recess, where said set screw hole extends through said locking shaft to said hole within said circular recess of said locking shaft;

(g) a handle attached to said locking shaft, said handle having a first end, a second end, and a longitudinal axis, said first end of said handle equipped with a cylindrical projection having the same longitudinal axis as said handle, said cylindrical projection equipped with a threaded set screw hole, said threaded set screw hole located on said cylindrical projection so that when said cylindrical projection is inserted into said hole with said circular recess of said locking shaft, said threaded set screw hole lines up with said set screw hole on said locking shaft, said handle equipped with a pin hole that extends through said handle, said pin hole extending through said handle where, when said handle is attached to said locking shaft and set of teeth of said locking shaft are engaged with said peripherally arranged teeth on said radial edge of said flywheel, said pin hole that extends through said handle is lined up with said pin hole on each of said pad eyes;

(h) a set screw inserted through said set screw hole on said locking shaft and threaded into said threaded set screw hole of said cylindrical projection on said first end of said handle to attach said handle to said locking shaft; and (i) a safety pin inserted through said pin hole in said handle and through said pin hole in each of said pad eyes to lock said handle and said locking shaft in place when said set of teeth of said locking shaft are engaged with said peripherally arranged teeth on said radial edge of said flywheel of said engine.

2. The lock out device of claim 1, where said base, said body, said set of pad eyes, said spring, said locking shaft, said handle, said set screw, and said safety pin are made of durable, rigid materials.

3. The lock out device of claim 2, where said base, said body, said set of pad eyes, said spring, said locking shaft, said handle, said set screw, and said safety pin are made of metal.

4. The lock out device of claim 3, where said base is bolted to said flywheel housing.

5. The lock out device of claim 4, where said body is permanently attached to said base.

6. The lock out device of claim 5, where said locking shaft is cylindrical in shape and has a length of nine inches and a diameter of one and one-half inches.

7. The lock out device of claim 6, where said spring has a length of four inches and a diameter of one and one-half inches.

8. The lock out device of claim 7, where said handle is cylindrical in shape and has a length of six inches and a diameter of one inch.

9. A method of locking peripherally arranged teeth on a radial edge of a circular flywheel in a flywheel housing of an engine, said method comprising the steps of:

(a) providing a base;

(b) attaching a body to said base, said body having a front wall, a top wall, and two side walls;

(c) boring a hole bored into said body through said front wall of said body;

(d) cutting a multi-directional slot into said top wall of said body and into one of said two side walls of said body, where a first portion of said slot has a depth that extends from said top wall of said body to said hole bored into said body, and where a second portion of said slot has a depth that extends from said one of said two side walls of said body to said hole bored into said body, where a first end of said slot begins on said top wall of said body near said front wall of said body, where said slot extends from said first end of said slot along said top wall of said body parallel to said longitudinal axis of said hole bored into said body, at which point said slot turns ninety degrees toward said one of said two sides walls of said body and extends toward said side wall until said slot reaches said side wall, at which point said slot extends down said side wall and then turns ninety degrees toward said front wall of said body and extends toward said front wall of said body parallel to said longitudinal axis of said hole bored into said body, where said slot ends at a second end of said slot on said side wall of said body at a point farther from said front wall of said body than said first end of said slot;

(e) extending a set of pad eyes from said top wall of said body perpendicular to said top wall, where one pad eye of said set of pad eyes is located near said first end of said slot on one side of said slot, where another pad eye of said set of pad eyes is located near said first end of said slot on the opposite of said slot, where each pad eye is equipped with a pin hole;

(f) inserting a spring into said hole of said body;

(g) inserting a locking shaft into said hole of said body after inserting said spring into said hole of said body, said locking shaft having a first end and a second end, said first end of said locking shaft equipped with a set of teeth for engaging said peripherally arranged teeth on said radial edge of said circular flywheel in said flywheel housing of said engine; said second end of said locking shaft equipped to butt up against said spring when said locking shaft and said spring are inserted into said hole in said body, said locking shaft equipped with a circular recess and a hole within said circular recess between said first end and said second end of said locking shaft, said locking shaft equipped with a set screw hole adjacent to said circular recess and said hole within said circular recess, where said set screw hole extends through said locking shaft to said hole within said circular recess of said locking shaft;

(h) attaching a handle to said locking shaft through said multi-directional slot, said handle having a first end, a second end, and a longitudinal axis, said first end of said handle equipped with a cylindrical projection having the same longitudinal axis as said handle, said projection equipped with a threaded set screw hole, said threaded set screw hole located on said projection so that when said projection is inserted into said hole with said circular recess of said locking shaft, said threaded set screw hole lines up with said set screw hole on said locking shaft;

(i) equipping said handle with a pin hole that extends through said handle, said pin hole extending through said handle where, when said handle is attached to said locking shaft and set of teeth of said locking shaft are engaged with said peripherally arranged teeth on said radial edge of said flywheel, said pin hole that extends through said handle is lined up with said pin hole on each of said pad eyes;

(j) securing said handle to said locking shaft by inserting a set screw through said set screw hole on said locking shaft and by threading said set screw into said threaded set screw hole of said cylindrical projection on said first end of said handle;

(k) attaching said base to said flywheel housing of said engine so that said handle can be maneuvered to extend said locking shaft out of said hole in said body to engage said set of teeth at said first end of said shaft with said peripherally arranged teeth on said radial edge of said circular flywheel in said flywheel housing of said engine;

(l) inserting a safety pin through said pin hole in said handle and through said pin hole in each of said pad eyes to lock said handle and said locking shaft in place when said set of teeth of said locking shaft are engaged with said peripherally arranged teeth on said radial edge of said flywheel of said engine; and (m) maneuvering said handle to retract said locking shaft into said hole in said body to disengage said set of teeth at said first end of said shaft from said peripherally arranged teeth on said radial edge of said circular flywheel in said flywheel housing of said engine.

\* \* \* \* \*